Sept. 24, 1968 J. M. DELI 3,402,974
TRACK JOINT HAVING FLOATING SEAL
Filed Aug. 30, 1966
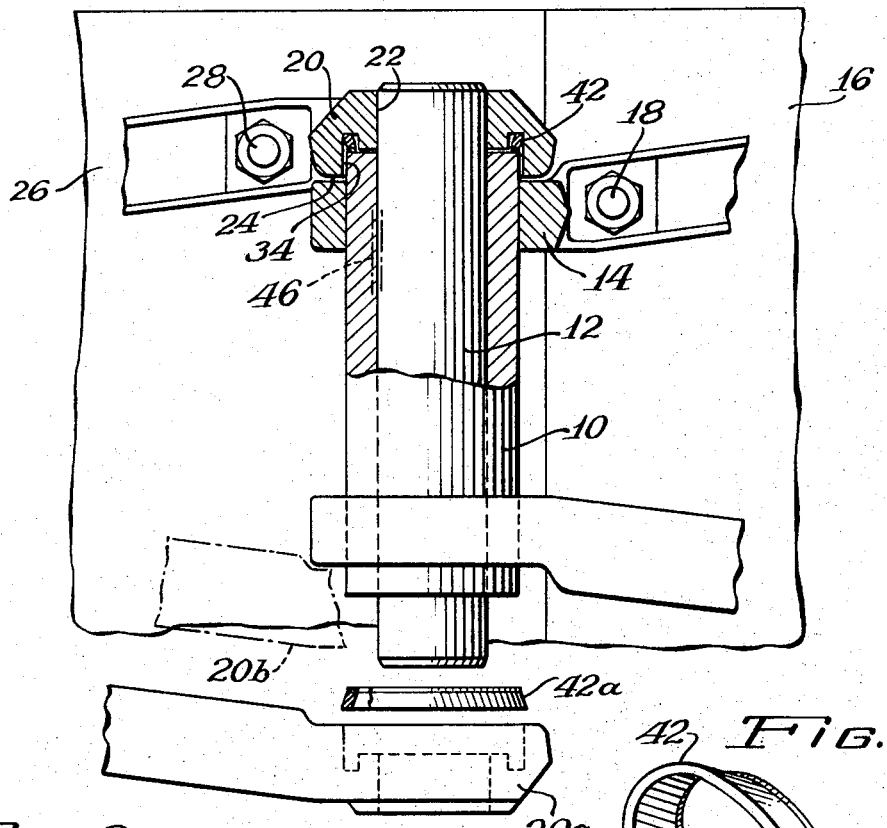
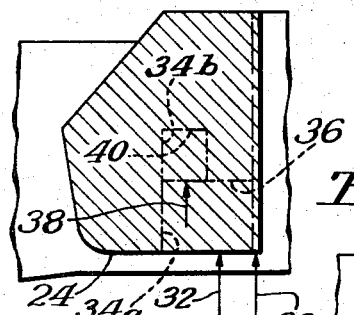
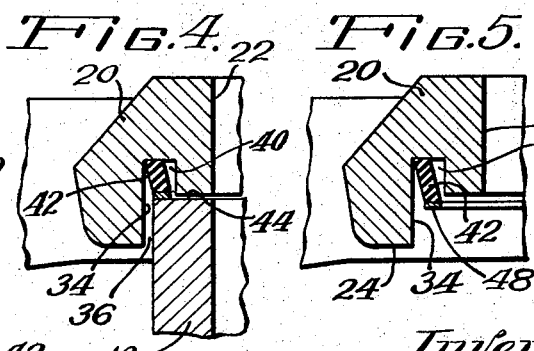
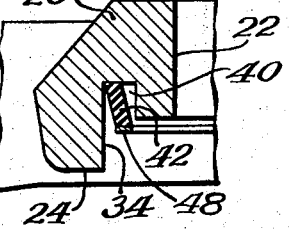
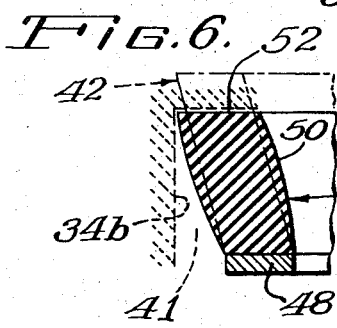
Inventor:
Jack M. Deli
By John W. Gaines
Atty.

United States Patent Office 3,402,974
Patented Sept. 24, 1968

3,402,974
TRACK JOINT HAVING FLOATING SEAL
Jack M. Deli, Wheaton, Ill., assignor to International Harvester Company, Chicago, Ill., a corporation of Delaware
Filed Aug. 30, 1966, Ser. No. 576,152
5 Claims. (Cl. 305—11)

ABSTRACT OF THE DISCLOSURE

Interlocked track joint having a floating seal. The joint includes, in combination with a bushing and a pin therein and projecting therefrom at one end, a link on the projecting end of the pin. The link has a counterbore in which the bushing is piloted at the thrust end of the bushing, a floor in the counterbore engaging the bushing end in an inner ring of thrust transmitting pressure contact, and a seal recess intersecting the floor so as to form a prolongation of the counterbore. The floating seal, having a unitary construction of Belleville shape, is a composite structure fitting in the recess and provided with a backup body part which carries a flat metal ring part. The ring part engages the bushing end in an outer ring of pressure contact to form a metal-to-metal seal.

---

In the floating seal type track joint construction as shown in FIGURES 1, 2, 3, 4, 5, and 6 of the accompanying drawing, a bushing 10 has a track pin 12 rotatably received therein and, at one end, an inner link portion 14 embraces that end of the bushing 10. The link carries a relatively leading track shoe 16 secured thereto by bolts including a bolt 18.

A bored outer link 20, which embraces a corresponding end of the pin 12, has a bore 22 in which the pin is received, and has an inner face 24 which mutually confronts the inner link portion with a space of between 0.000 and 0.010 inch therebetween. The link 20 carries a trailing track shoe 26 secured thereto by bolts including a bolt 28. The links are steel forgings.

A rotary cutting tool, not shown, is introduced in the direction of an arrow 30 (FIGURE 2) so as to remove the material and form the finished bore 22. A re-bore, indicated by an arrow 32 between the bore 22 and a cylindrical wall 34, forms a main portion 34a of the cylindrical wall 34 (FIGURE 5), and also forms the radially inwardly extending main floor of a counterbore 36 receiving, and confronted by, the adjacent end of the bushing 10. A re-bore indicated by an arrow 38 between the cylindrical wall and the main transverse floor of the counterbore 36 forms a seal recess 40 with a second floor and a general prolongation or continuation 34b of the main portion 34 of a cylindrical wall.

The re-boring can be done separately, or jointly so that the counterbore 36 and recess 40 are formed in one operation of the same tool.

A seal assembly 42, bonded together in one piece and having the shape of a Belleville washer is inserted, large end first, into the seal recess of the outer link 20 before that link is press fitted onto the adjacent end of the pin 12. An identical seal assembly 42a is similarly introduced into an identical companion outer link 20a before the latter is press fitted onto the opposite end of the pin 12. The finally assembled position of the companion link 20a is indicated by the broken lines 20b.

The FIGURE 4 showing of the end face 44 of the bushing 10 is illustrative of treatment of the opposite end faces of the bushing according to my invention. The face 44 has concentric, coplanar rings of pressure contact, the inner one of which is a static seal made with the floor of the counterbore 36 in thrust transmitting relation, and the outer one of which is made with the small end of the seal assembly 42 in dynamic sealing relation. The gap illustrated in FIGURE 4 between the cylindrical wall 34 and the cylindrical bushing 10 is shown greatly exaggerated, and in practice hardly more than a piloting amount of clearance is present so that the housed end of the bushing will stay fairly free from contaminant.

The foregoing joint is sealed and lubricated for life at the factory. The seal 42 seals in the lubricant along its ring of pressure contact with the bushing end face 44 and seals out any contaminant which may sift in along the cylindrical wall 34. While it is true that wear is inevitable along the cylindrical interface 46 of contact between pin and bushing because of large track tension forces and the snaking action of the track, wear of the thrust end face 44 of the bushing is kept at a minimum by the body of internal lubricant.

In FIGURE 6, the seal 42 axially foreshortens so that the wall thickens when compressed into place in the recess 40 by the bushing 10. It consists of a flat steel, bushing engaging sealing ring 48 of small diameter and an elastomeric back-up portion 50. The back-up portion is frusto conical in shape and generally conforms to a parallelogram in cross-section.

The back-up portion 50 extends axially and rearwardly from the ring 48, in inclined relation thereto, and with the small leading end being of the same diameter as, and rubber-to-metal bonded to the rear face of, the sealing ring 48. In one embodiment the cone angle, at the apex, of the seal assembly was slightly in excess of 45°. The seal assembly works and self-adjusts in service. With the prolongation 34b of the cylindrical bore wall, the assembly defines a self-purging gap at 41 (FIGURE 6) having an annular shape of decreasing thickness.

A large diameter, radially outer end 52 of the back-up portion has radial and axial engagement with the cylindrical wall part and floor part of the seal recess 40 which is spaced apart axially and radially outwardly from the sealing ring 48. In cooperation with the ring, the large end 52 places the back-up portion 50 in unrestricted axially and radially distortively compressed condition throughout the entire cross-section thereof between the engaged parts of the recess and the sealing ring. It is clear upon inspection of FIGURES 1 and 4 to 6 that the back-up portion is otherwise unconfined within the sealed recess 40.

In service, each outer link 20 retains a sound counterbore, and can be reused when the pin and bushing have worn at interface 46 to the point that replacement or turning is necessary. One of the contributing factors is the inner ring of pressure contact which is metal to metal against the bushing end face 44 but which is coated with lubricant and unyieldingly takes the thrust of the so-called side loading of the chain. Another factor is the outer ring of pressure contact on the end face 44 which is metal to metal but coated with lubricant and which provides a floating seal. The back-up behind the outer ring of pressure contact comprises an elastomeric portion 50, freely acting in combined compression and shear, to axially yield and adapt over a wide range of adjustment due to variations such as manufacturing variations and tolerances. The final factor is the bushing counterbore 36, i.e., a counterbore in the outer link wherein the bushing and outer link overlap, protecting the joint and enabling the link to house substantially the entire thrust or outer end portion of the bushing therein.

My sealed joint is primarily adapted to crawler vehicles, for use in the endless track assemblies thereof in which the links form a chain at each side. The chain and track shoes are conventional in that respect, the crawler track construction and operation being generally known as shown in expired Patent No. 2,376,864. All joints in the endless track are sealed at each end in the same way, except possibly for the master pin joint, not shown.

The language herein calling for embracing one part of a pair by the other part, is in reference to using a pressed together assembly in which an interference fit between the pair of parts prevents relative rotation and prevents endwise shift of the embraced part. By a back-up portion which is elastomeric I mean a compounded natural or synthetic rubber, such as Buna-N material which is a readily available, abrasion resistant, seal elastomer in commercial use. Contaminant has reference to silt, dirt, and other abrasion-causing foreign matter.

What is claimed is:

1. For use in a bushing counterbore, between the annular seal recess of a track link and the confronting end face of a track pin bushing:
    an end face seal assembly comprising a bushing-engaging flat ring of relatively inflexible metal; and
    an elastomeric back-up portion frusto conical in shape and generally conforming to a parallelogram in cross-section, said back-up portion having a relatively small, bonded end portion corresponding in diameter to, and bonded to the rear of, the ring;
    said back-up portion having a large diameter, recess-received end to take the axial and radial seal reaction and, in cooperation with said ring, placing said back-up portion in unrestricted axially and radially distortively compressed condition throughout the entire cross-section thereof between said end and said ring;
    said back-up portion except for constraint of said end and by said ring being otherwise unconfined in its freedom of movement.

2. In the inner face structure of a track link said link having a primary bore in which the link receives a track pin, said link being of the bushing counterbore type, in the inner face of which the received end of a bushing is adapted to be piloted:
    the combination with the bushing, of a counterbore in the link which for a major portion is coextensive with and which houses the piloted end of the bushing in the link, said counterbore having a main floor;
    a continuation of the counterbore forming a seal recess confronting the outer portion of the piloted end;
    an end face seal assembly in said recess comprising a flat metal sealing ring, and an elastomeric back-up portion frusto-conical in shape and generally conforming to a parallelogram in cross section;
    the bushing being piloted at the end in the counterbore so that the end face at that end is subjected to co-planar, essentially concentric rings of pressure contact, the inner one of which is afforded by the main floor of the counterbore in a thrust transmitting relation, and the outer one of which is afforded by the sealing ring in a floating-seal relation;
    said backup portion of the seal assembly extending axially rearwardly from said flat metal sealing ring, in inclined relation thereto, and with the leading end bonded to the rear of the metal;
    said back-up portion providing axial and radial engagement, by means of the other end, with a part of said seal recess spaced apart axially and radially outwardly from said metal sealing ring and, in cooperation with said ring, placing said back-up portion in unrestricted axially and radially distortively compressed condition throughout the entire cross section thereof between said recess part and said flat metal sealing ring;
    said back-up portion except for its engagement with said ring and said part being otherwise unconfined within said seal recess.

3. In an endless track, chain, or the like having a bushing and pin joint:
    the combination with the bushing and a companion pin received therein, of a bored link embracing an end of the pin, having a bore in which the pin is so embraced and which is adapted to intersect a bushing counterbore, said link further having an inner face;
    a rebore in the link between and intersecting the bore and the inner face, comprising a bushing counterbore formed with a cylindrical wall for receiving, and formed with a transverse main floor for engaging, the end of the bushing piloted therein;
    a second rebore in the link between the cylindrical wall and main floor, forming a seal recess having a second floor and providing a general prolongation of said cylindrical wall;
    the main and second floors characterized respectively by a deep offset from, and a deeper offset from, the inner face of the link; and
    a seal in the recess engaging said piloted end of the bushing;
    said main floor engaging the piloted end of the bushing in a ring of pressure contact in thrust transmitting relation, and said seal engaging the piloted end in in a ring of pressure contact in sealing relation, and providing an inner and outer ring arrangement wherein each is formed by metal-to-metal contact and the thrust transmitting ring is the inner one and the sealing ring is the outer one;
    said seal comprising an assembly of a large, resiliently flexible back-up portion and a relatively inflexible and small, flat metal sealing ring;
    said back-up portion having a small end of a size corresponding to the flat metal sealing ring and bonded to the metal at the rear thereof, and being frusto-conical in shape and generally conforming to a parallelogram in cross section, the large end of the back-up portion being adapted to transmit the seal assembly reaction and, in cooperation with said ring, placing said back-up portion in unrestricted axially and radially distortively compressed condition throughout the entire cross section thereof, and being otherwise unconfined within said seal recess.

4. The invention of claim 3, further characterized by:
    an inner link portion embracing the bushing at a point spaced away from the piloted end thereof, and confronting the inner face of the bored link.

5. The invention of claim 4, characterized by the prolongation of the cylindrical wall within the seal recess and the confronting seal assembly within the seal recess presenting an annular gap of decreasing thickness to contaminant sifting past said inner face of the bored link.

References Cited

UNITED STATES PATENTS

| | | | |
|---|---|---|---|
| 2,699,974 | 1/1955 | Deffenbaugh | 305—58 X |
| 3,195,421 | 7/1965 | Rumsey | 277—95 X |
| 3,206,258 | 9/1965 | Heinrich | 305—11 |
| 3,241,843 | 3/1966 | Hatch | 277—92 |
| 3,269,738 | 8/1966 | Baumler | 277—81 |
| 3,336,086 | 8/1967 | Reinsma | 305—11 |

RICHARD J. JOHNSON, *Primary Examiner.*